United States Patent
Grafton et al.

(10) Patent No.: US 10,306,174 B1
(45) Date of Patent: May 28, 2019

(54) MULTI SENSORY INPUT TO IMPROVE HANDS-FREE ACTIONS OF AN ELECTRONIC DEVICE

(71) Applicant: GOOGLE LLC, Mountain View, CA (US)

(72) Inventors: James Grafton, London (GB); James Kent, Banstead (GB)

(73) Assignee: GOOGLE LLC, Mountain View, CA (US)

( * ) Notice: Subject to any disclaimer, the term of this patent is extended or adjusted under 35 U.S.C. 154(b) by 182 days.

(21) Appl. No.: 14/486,342

(22) Filed: Sep. 15, 2014

(51) Int. Cl.
*H04N 5/44* (2011.01)

(52) U.S. Cl.
CPC ... *H04N 5/4403* (2013.01); *H04N 2005/4444* (2013.01)

(58) Field of Classification Search
CPC .......... H04N 21/41402; H04N 21/485; H04N 2005/4444; G06F 3/0482
USPC ...................................................... 340/12.53
See application file for complete search history.

(56) References Cited

U.S. PATENT DOCUMENTS

| | | | |
|---|---|---|---|
| 2003/0037144 A1* | 2/2003 | Pestoni | G06Q 30/02 709/226 |
| 2009/0030886 A1* | 1/2009 | Pandeya | G06F 17/30867 |
| 2012/0046071 A1 | 2/2012 | Brandis et al. | |
| 2012/0127089 A1* | 5/2012 | Waas | G06F 3/04883 345/173 |
| 2013/0077820 A1 | 3/2013 | Marais et al. | |
| 2013/0151970 A1* | 6/2013 | Achour | H04N 21/854 715/723 |
| 2013/0227418 A1 | 8/2013 | Sa et al. | |
| 2013/0278501 A1 | 10/2013 | Bulzacki | |
| 2013/0294358 A1* | 11/2013 | Kim | H04W 72/12 370/329 |
| 2014/0108927 A1 | 4/2014 | Vaidya et al. | |

* cited by examiner

*Primary Examiner* — Vernal U Brown
(74) *Attorney, Agent, or Firm* — Morgan, Lewis & Bockius LLP

(57) ABSTRACT

In one general aspect, a method can include detecting at least one indicator of user-initiated interaction with a computing device, obtaining data related to a demographic of a user of the computing device, identifying a current state of the computing device, determining that content displayed on a first display device included in the computing device is to be casted to a second display device separate from the computing device based on the at least one indicator of the user-initiated interaction with the computing device, the data related to a demographic of a user of the computing device, and the current state of the computing device, and casting the content displayed on the first display device to the second display device.

25 Claims, 9 Drawing Sheets

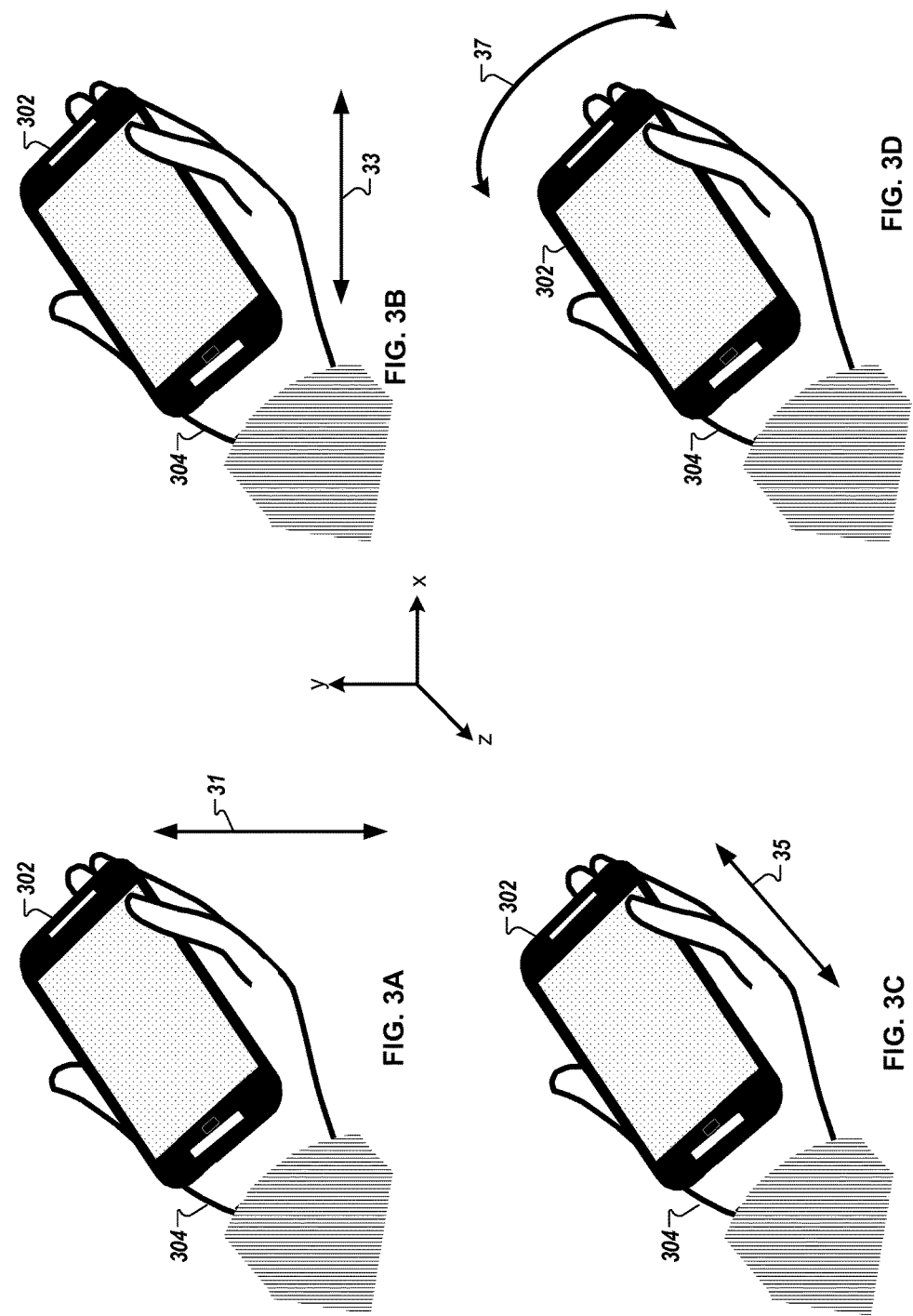

MULTI SENSORY INPUT TO IMPROVE HANDS-FREE ACTIONS OF AN ELECTRONIC DEVICE

TECHNICAL FIELD

This description generally relates to computing devices. The description, in particular, relates the use of gestures to initiate actions on a computing device.

BACKGROUND

Users have many ways to view content on computing devices. A user may have a laptop computer, a tablet computer, and a mobile phone that are all enabled to provide content to a user for viewing on a display device included in the particular computing device. Though the quality and resolution of the display device included in the computing device may be sufficient for viewing the content, many users may also own one or more flat screen televisions (TVs) or auxiliary monitors. The TVs and monitors may be much larger than the display device included in the computing device and can provide, in many cases, significant improvements in quality and resolution for viewing content. The ability for a user to view content on the TVs or auxiliary monitors can enhance the user's viewing experience.

SUMMARY

In one general aspect, a method can include detecting at least one indicator of user-initiated interaction with a computing device, obtaining data related to a demographic of a user of the computing device, identifying a current state of the computing device, determining that content displayed on a first display device included in the computing device is to be casted to a second display device separate from the computing device based on the at least one indicator of the user-initiated interaction with the computing device, the data related to a demographic of a user of the computing device, and the current state of the computing device, and casting the content displayed on the first display device to the second display device.

Example implementations may include one or more of the following features. For instance, the determining can further include determining that a probability associated with the casting exceeds a threshold value. The method can further include receiving confirmation that the computing device is to perform the casting before the computing device casts the content. The method can further include receiving, after casting, an indication of a response of a user to the casting. The method can further include storing the indication of the response in association with the casting. The method can further include identifying at least one user preference associated with the computing device and included in an account accessible by a user of the computing device. Determining that content displayed on a first display device included in the computing device is to be casted to a second display device separate from the computing device can further be based on the at least one user preference. The method can further include updating at least one of the data related to the demographic for the user and the at least one user preference based on the received indication of the response of the user. The demographic data can be obtained from one or more demographic data records for a common subset of demographics. The demographic data can be for the user of the computing device. The user-initiated interaction with the computing device can be a physical interaction of a user with the computing device. The user-initiated interaction can be a movement of the computing device by a user of the computing device. Identifying a current state of the computing device can be based on receiving data indicative of at least one identified condition associated with the computing device. A current state of the computing device can be identified as one of playing music, playing video content, and displaying an image on the first display device. The data indicative of at least one identified condition associated with the computing device can be received from one or more sensors included in the computing device. The casting can further include displaying the content on the second display device without displaying the content on the first display device, and allowing the computing device to control the displaying of the content on the second display device.

In another general aspect, a computing device includes a plurality of sensors configured to provide data indicative of at least one identified condition associated with the computing device, a location detection module configured to determine a location associated with the computing device, a device context module configured to determine a context of the computing device, a gesture detection module configured to determine at least one gesture associated with the computing device, a memory configured to store demographic data associated with a user of the computing device, a prediction module configured to identify at least one activity to perform on the computing device based on the location, the context, and the at least one gesture, and an activity module configured to perform the at least one activity on the computing device.

Example implementations may include one or more of the following features. For instance, the computing device can further include a first display device, and the identified at least one activity can be providing content displayed on the first display device to a second display device separate from the computing device. The plurality of sensors can include one or more of a temperature sensor, an ambient light sensor, a magnetic field sensor, a gyroscope, a heart rate sensor, a relative humidity sensor, an accelerometer, a pressure point sensor, an altimeter, a barometer, an infrared (IR) sensor, and a step detector. The at least one gesture associated with the computing device can include one of a rotation, a shaking, a squeezing, an up-and-down motion, a side-to-side motion, a back-and-forth motion, and a contact of a surface of the computing device. The prediction module can be further configured to identify at least one activity to perform on the computing device based on a probability value associated with the at least one activity. The activity can be performed on the computing device if the probability value exceeds a threshold value.

In yet another general aspect, a non-transitory, machine-readable medium has instructions stored thereon, the instructions, when executed by a processor, causing a computing device to detect at least one indicator of a user-initiated interaction with a computing device, obtain data related to a demographic of a user of the computing device, identify a current state of the computing device, identify at least one user preference, determine that content displayed on a first display device included in the computing device is to be provided to a second display device separate from the computing device based on the at least one indicator of the user-initiated interaction with the computing device, the data related to a demographic of a user of the computing device, the current state of the computing device, and the at least one user preference, and provide the content displayed on the first display device to the second display device for displaying on the second display device.

Example implementations may include one or more of the following features. For instance, the determining can further include determining that a probability associated with the casting exceeds a threshold value. The instructions can further cause a computing device to receive confirmation that the computing device is to provide the content before the computing device provides the content. The instructions can further cause a computing device to receive, after providing the content, an indication of a response of a user to the providing of the content. The at least one user preference can be associated with the computing device and can be included in an account accessible by a user of the computing device. Identifying a current state of the computing device can be based on receiving data indicative of at least one identified condition associated with the computing device.

The details of one or more implementations are set forth in the accompanying drawings and the description below. Other features will be apparent from the description and drawings, and from the claims.

BRIEF DESCRIPTION OF THE DRAWINGS

FIGS. 3A-F are diagrams that show illustrations of user interactions with a computing device that result in particular detected movements and/or gestures.

Like reference symbols in the various drawings indicate like elements.

DETAILED DESCRIPTION

Figure 1:
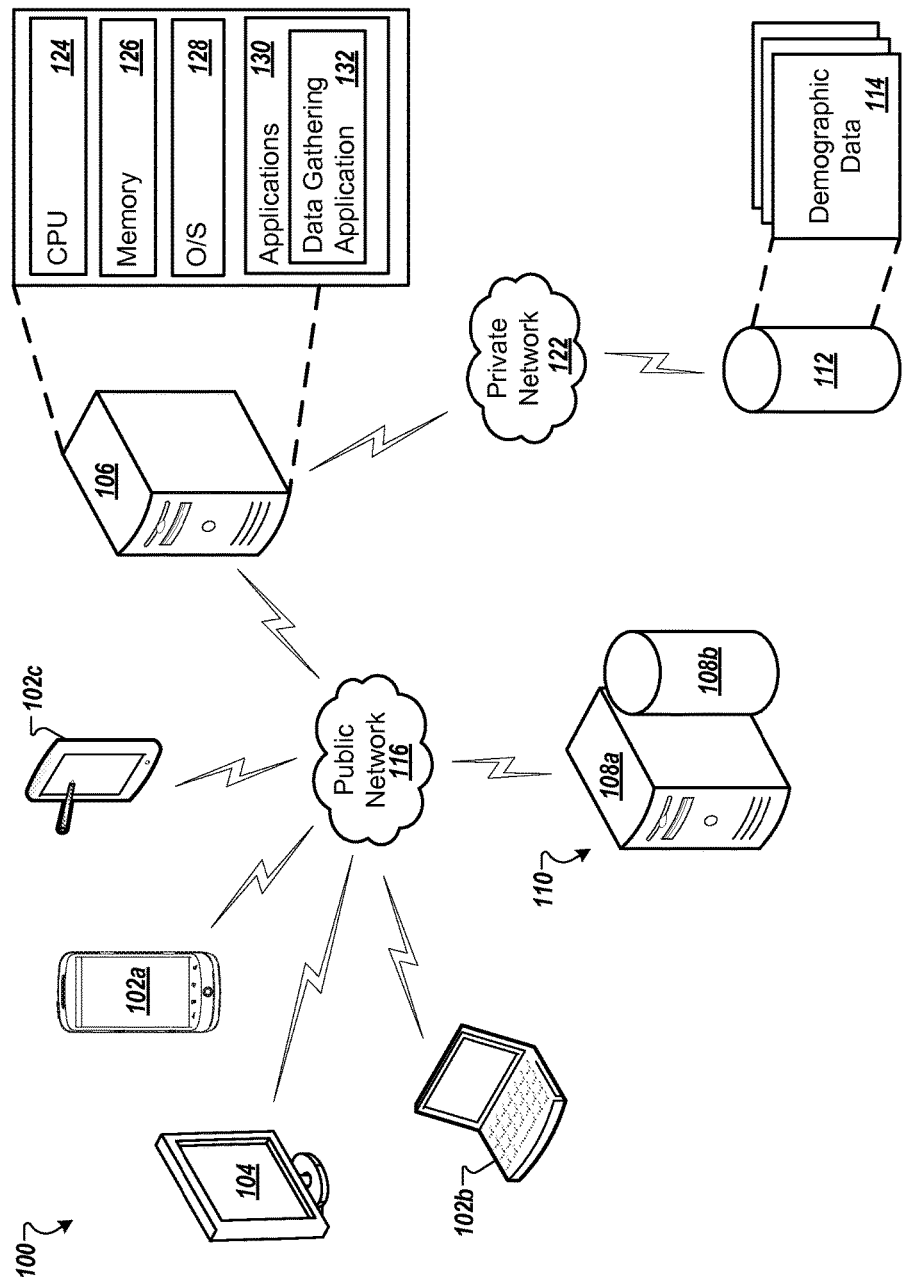
FIG. 1 is a diagram that illustrates an example system for associating and/or identifying an action for performing on a computing device with data associated with the computing device.

A user can be interacting with content presented on a computing device. The content can be a video with or without sound (e.g., streaming video with audio and visual content), a picture, an application or other types of content. In some cases, the content can include video or image data that can be provided to a display device included in the computing device. In addition or in the alternative, the content can include audio data that can be provided to one or more speakers included in the computing device.

The user can make contact with the physical computing device in a particular location(s) on the computing device. The contact can trigger the providing of the content currently being presented on the computing device to being presented on another device capable of presenting the content. In some implementations described below, this may be referred to as casting. In cases where the content is a video with sound, the other device is capable of displaying the visual content while also providing the audio portion of the content.

In some implementations, a user can trigger a casting, from a computing device that includes a first display device, to a second display device using a manual touch or gesture that contacts the physical computing device in a particular location. This touch or gesture may not be intuitive to a user because of the different types of computing devices available for use by a user (e.g., a laptop computer, a notebook computer, a tablet, a mobile phone, a smartphone, etc.). In addition or in the alternative, this touch or gesture may not be intuitive to a user because of the variation of the particular location on each computing device for the touch contact. The location of the touch contact on a computing device can also vary dependent on the application running on the computing device.

In some cases, the casting can be triggered using voice recognition. Voice recognition, however, can be unreliable dependent on the environment in which it is used. As such, each computing device can implement a process for triggering second screen content where the user interface and/or the user experience can vary and, in some cases, may be unintuitive to the user and even unreliable.

A computing device (e.g., a laptop computer, a notebook computer, a tablet, a mobile phone, a smartphone) can identify one or more typical patterns of movement of the computing device. The identified movement patterns can be used along with other data provided by the computing device, the context of the computing device, and demographic data associated with a user of the computing device to determine a particular action to be performed on the computing device. For example, a particular movement pattern of a mobile phone can be the placement of a mobile phone in a stationary, flat position on a horizontal surface when viewing a video. If a cast-enabled device is identified in proximity to the mobile phone, the particular movement pattern can be associated with a "request to cast" what is being displayed on the mobile phone to a second display device.

Though an example of casting from a first display device to a second display device is given, there are many other situations where a detected pattern of movement of a computing device along with other data provided by the computing device, the context of the computing device, and/or data associated with a user of the computing device or the demographic of a user of the computing device can be used to associate the detected pattern of movement of the computing device with performing a particular action on the computing device. For example, headphones are plugged into a mobile device on a weekday morning when a user is at work. This detected situation can trigger the playing of a particular type of music (soothing music) on the mobile device. In another example, a mobile device is tightly squeezed while being shaken triggering an audible alarm on the computing device.

An algorithm executed by the computing device can "learn" (e.g., learn while in a learning mode, learn in response to multiple repeated interactions over a period of time) to associate certain typical patterns of movement of the computing device with actions performed by the computing device. The typical patterns of movement can be observed/sensed during/within a context (current state of)

the movement-enabled computing device. A user of the computing device may be provided with an opportunity to control whether programs or features included in the computing device may collect this information.

For example, the algorithm can learn that if the user places the mobile phone down in a flat position on a horizontal surface while a video is being displayed on the mobile phone and does not cancel the playing of the video on the mobile phone in a particular amount of time (the video continues to be displayed on the second display device), the probability that this movement is a "request to cast" is increased. This can indicate that the user desires the same behavior (casting the video from the first display device to the second display device) when performing the same movement (placing the mobile phone down in a flat position on a horizontal surface while a video is being displayed on the mobile phone). The casting will display the video on the second display device without displaying it on the first display device.

For example, the algorithm can learn that if a user performs a particular gesture/motion (e.g., places a mobile device down in a flat position on a horizontal surface, rotates/shakes the mobile device, contacts/taps a touchscreen of the mobile device) while the computing device is playing an audio file (e.g., the user is listening to music, an audio book, a webcast) and the user does not cancel the playing of the audio file on the mobile device in a particular amount of time (the audio continues to be played on the mobile device), the probability that this movement is a "request to send audio to remote speakers" is increased. This can indicate that the user desires the same behavior (e.g., sending the audio file to one or more speakers not included in the mobile device, no longer playing the audio file on the mobile device) when performing the same movement.

In another example, a user may select a setting included in a cast-enabled application included on a mobile device. The setting can indicate that if the cast-enabled application is playing a video on the mobile device, and the mobile device is placed in a flat position on a horizontal surface, casting is automatically triggered, casting the video from the first display device to the second display device.

Associating particular patterns of movement of a computing device with actions performed by the computing device can result in a more pleasurable user experience with the computing device. User interactions with the computing device that can be based on patterns of movement of the computing device and/or gestures detected by the computing device can be seamless and accurate as the machine learning of the device correctly associates the desired action with the particular movement pattern and/or gesture. In addition, the user can spend less time having to interact with the computing device (e.g., interacting with one or more applications running on the computing device) in order to initiate the performing of the action desired by the user—one quick gesture/motion can initiate the desired action.

FIG. 1 is a diagram that illustrates an example system 100 for associating and/or identifying an action for performing on a computing device with data associated with the computing device.

The system 100 includes computing devices 102a-c. For example, computing device 102a can be a mobile phone, a smartphone, a personal digital assistant, or other type of mobile computing device. For example, computing device 102b can be a laptop or notebook computer. For example, computing device 102c can be a tablet computer. The computing devices 102a-c can communicate, using a public network 116, with other computing devices or computer systems. In some implementations, the computing devices 102a-c can perform client-side operations, as discussed in further detail herein. Though this document describes the use of the computing device 102a, the descriptions are also relevant to the computing device 102b and the computing device 102c.

The system 100 also includes an auxiliary device 104. For example, the auxiliary device 104 can be a flat screen television (TV) or any other type of digital TV. The auxiliary device 104 can include a display portion and one or more speakers. In another example, the auxiliary device 104 may be one or more audio output devices (e.g., speakers). The auxiliary device 104 can be capable of communicating, using a public network 116, with other computing devices or computer systems that include applications or other programs or software for casting or controlling the sending of content from the computing device that includes the control software to the casting device. For example, the computing device 102a can include a casting application (e.g., a video sharing application) that can cast a video being viewed on the computing device 102a and/or audio content being played on the computing device 102a to the auxiliary device 104. In some cases, the video may be a streaming video that includes audio content and the streaming video is casted to the auxiliary device 104 using the casting application (the cast-enabled application). In some implementations, the computing device 102a can be running a web-browser application. The web-browser application can be cast-enabled and can cast a tab of the web-browser application to the auxiliary device 104. In this case, content rendered in the casted tab will be casted to/displayed on the auxiliary device 104.

The system 100 also includes an information server 106 and a content computer system 110 that includes a content server 108a and a content database 108b. Though not shown in FIG. 1, the system 100 can include multiple servers (computing devices) working together to perform server-side operations. In some cases, a single proprietor can provide the servers. One or more of the servers can be information servers (e.g., the information server 106). In some cases, the one or more of the servers can provide other functionalities for the proprietor. In a non-limiting example, the multiple servers can include a search server and a web crawler server.

The computing devices 102a-b can communicate with the information server 106 and the content server 108a using the public network 116. The computing devices 102a-c can request/access content included in the content database 108b by way of the public network 116 and the content server 108a. The computing devices 102a-c can communicate with the information server 106 (and the information server 106 can communicate with the computing devices 102a-c) using the public network 116.

The information server 106 can manage/maintain data that includes information and other metrics related to demographics for a general population of users (e.g., statistical data relating to a general population of users and particular groups within the general population). For example, the information server 106 can communicate with a demographic data database 112 using a private network 122. The demographic data included in the demographic data database 112 may not be tethered to the identity of any individual user of the computing devices 102a-c. The demographic data database 112 can include (e.g., store and/or serve as a repository for) a plurality of demographic data records 114. The demographic data records 114 can include statistical data aggregated for groups of users based on demographics.

The aggregation of the statistical data for the groups of users can be done in a hierarchical manner where the statistical data can become more specific as the general population of users is narrowed based on the demographics. For example, a first aggregation of data can be for a demographic group that includes individuals who are between the ages of 18 years old and 24 years old. A second aggregation of data can further narrow the demographic group to individuals who are between the ages of 18 years old and 24 years old and are students. By adding additional criteria to a demographic group, the size of the demographic group can decrease. The data gathering application 132 can sort the data included in the demographic data records 114 by a particular demographic.

The demographic data records 114 can include historical data that can be analyzed by the information server 106. The information server 106 using the historical data included in the demographic data records 114 can provide "machine learned" data and information to the computing device 102a to help identify an action to perform on the computing device. Demographic data obtained from one or more demographic data records can be for a common subset of demographics. For example, a common subset of demographics can include individuals who are between the ages of 18 years old and 24 years old and are students. In another example, common subsets of demographics can include, but are not limited to, individuals who are commuters who drive to work, individuals who are commuters who take public transportation to work.

For example, the demographic subset of individuals that commute to work in automobiles can include data that indicates if the demographic of the automobile commuter is listening to music (playing an audio file) on a mobile device when they enter an automobile and the user performs a particular gesture/motion with the computing device, that the audio file should be switched to playing on the audio device (e.g., radio) included in the automobile. Based on the demographic data and the device context, the computing device 102a can determine that if a user that is included in the demographic group of commuters who drive to work rotates/shakes a mobile device when entering/sitting in an automobile that the audio file should be transferred to the audio device on the automobile.

In another example, the demographic subset of individuals that commute to work using public transportation (e.g., trains, subways, busses) can include data that indicates if the demographic of the public transportation commuter is listening to music (playing an audio file) on a mobile device using headphones when they enter the public transportation and the user performs a particular gesture/motion with the computing device, that the volume of the audio file will increase or decrease dependent on the direction and/or type of gesture/motion performed by the user. Based on the demographic data and the device context, the computing device 102a can determine that if a user that is included in the demographic group of commuters who use public transportation to commute to work and the user rotates/shakes a mobile device when entering the public transportation that the volume of the audio file should be changed dependent on the particular gesture/motion. The computing device 102a can manage/maintain data that includes information and other metrics related to a user of the computing device 102a in the instance where a user consents to the use of such data. For example, memory included in the computing device 102a can include (e.g., store and/or serve as a repository for user data where a user consents to the use and storage of such data.

The public network 116 can be a public communications network (e.g., the Internet, cellular data network, dialup modems over a telephone network). The private network 122 can be a private communications network (e.g., private LAN, leased lines). In some implementations, the computing devices 102a-c can communicate with the public network 116 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.). In some implementations, the information server 106 can communicate with the private network 122 as well as the public network 116 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

The information server 106 can include one or more processors (e.g., server CPU 124), and one or more memory devices (e.g., server memory 126). The information server 106 can execute a server O/S 128, and one or more server applications 130. The server applications 130 can include a data gathering application 132. The information server 106 can access the demographic data database 112 in order to provide one or more of the demographic data records 114 to the data gathering application 132. The data gathering application 132 can use the demographic data records 114, the data gathering application 132 can identify a hypothesized action to be performed on the computing device 102a. The hypothesized action can be provided by the information server 106 to the computing device 102a.

For example, the demographic data records 114 can include historical data that indicates when a student between the ages of 18 and 22 years old shakes a computing device that they are watching streaming video content on, there is a high probability that the shaking of the computing device indicates that the student wishes to provide the streaming video content to an auxiliary device (e.g., cast the streaming video content to a cast-enabled device). User demographic data can indicate that a user of the computing device 102a is an 18 year old student. The computing device 102a can provide the information server 106 with the user data. The computing device 102a can receive an indication of the hypothesized action along with the historical data. The computing device 102a can use the indication of the hypothesized action when determining an action to perform on the computing device 102a.

In some implementations, voice-input can be used to initiate an action on the computing device 102a. For example, a user can speak "OK, please cast" into the computing device in order to provide/send content being displayed on a first display device included on the computing device 102a to the auxiliary device 104. Machine learning by the computing device 102a recognizes the voice-input stream of "OK, please cast" and initiates the action of providing/sending content being displayed on a first display device included on the computing device 102a to the auxiliary device 104. In some implementations, the voice-input can be used in combination with contextual and/or demographic information when being recognized to initiate a particular action on the computing device 102a. The contextual information can be gesture/motion context and/or environmental context (e.g., location, temperature, humidity, etc.).

Figure 2:
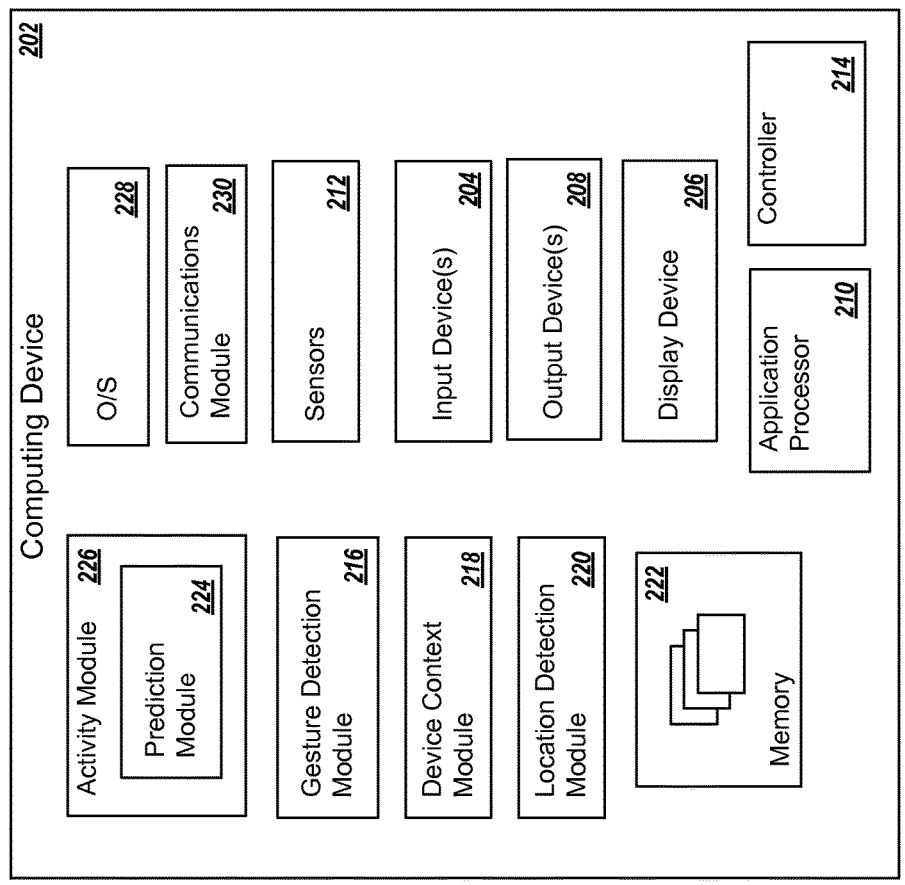
FIG. 2 is a block diagram illustrating example modules included in a computing device.

FIG. 2 is a block diagram illustrating example modules included in a computing device 202. In some implementations, the computing device 202 can be part of or included in the computing device 102a, the computing device 102b, or the computing device 102c as shown in FIG. 1.

The computing device 202 includes input device(s) 204. The input device(s) 204 can include, but are not limited to, a touchscreen display, a keyboard, a mouse, a trackpad, a touchpad, a pointing stick, one or more mouse buttons, a trackball, a joystick, and other types of input devices. The computing device 202 includes a display device 206. The display device 206 can include, but is not limited to, a liquid crystal display (LCD), a light emitting diode (LED) display, and a plasma display. In some implementations, the display device 206 can be a touchscreen. The computing device 202 includes output device(s) 208. The output device(s) 208 can include, but are not limited to, audio output devices (e.g., speakers), auxiliary lighting devices (e.g., LEDs), and haptic feedback devices (e.g., a vibration motor).

The computing device 202 can execute an operating system (O/S) 228. An application processor 210 can execute an application on the computing device 202. In some cases, an application can be integrated into the O/S 228. For example, the application can display a user interface (UI) on the display device 206 included in the computing device 202. The application can cause the computing device 202 to perform one or more actions on the computing device 202 that can include interactions with one or more of the input device(s) 204, the output device(s) 208, and the display device 206. In addition or in the alternative, application processor 210 can execute one or more web-based (web-hosted) applications.

The computing device 202 can include sensors 212. The sensors can include, but are not limited to, a temperature sensor, an ambient light sensor, a magnetic field sensor, a gyroscope, a heart rate sensor, a relative humidity sensor, an accelerometer, a barometer, a pressure point sensor, an altimeter, an infrared (IR) sensor, and a step detector. A controller 214 can process input data received from the sensors 212 and the input devices 204. The controller 214 can interact with a gesture detection module 216, a device context module 218, a location detection module 220, and a communications module 230.

The communications module 230 can provide communications capability for the computing device 202. For example, the computing device 202 may be capable of communicating with a network (e.g., the public network 116 in FIG. 1) using one or more wired and/or wireless communication interfaces/protocols, such as for example, 802.11 variations, WiFi, Bluetooth, Transmission Control Protocol/Internet Protocol (TCP/IP), Ethernet, and IEEE 802.3. In another example, the computing device 202 may be a mobile communications device (e.g., a cell phone) capable of communicating over a cellular network.

In some implementations, the location detection module 220 can use the proximity of the computing device 202 to a WiFi source/connection as a way of determining an approximate location of the computing device 202. For example, if a user connects to a WiFi connection provided by a coffee shop located in St. Paul, Minn., the location detection module 220 can determine, with the user's consent, that an approximate location for the computing device 202 is St. Paul, Minn. In some implementations, the computing device 202 can be enabled to use a Global Positioning System (GPS). The location detection module 220 can use the GPS coordinates of the computing device 202 to identify the location of the computing device 202. The location detection module 220 can access user data included in memory 222 to determine if the particular location of the computing device 202 is a location associated with the user. For example, the particular location can be a home or work location associated with the user (e.g., a location identified by the user as "home" or "work").

The device context module 218 can use information and data gathered/obtained by the sensors 212 and the input device(s) 204 along with a current operating state of the computing device 202 to determine a context for the computing device 202. For example, the device context module 218 can determine that the computing device 202 is currently playing/streaming a video that is being displayed on the display device 206. This context can be considered a "device" context because the context is based on what the computing device 202 is doing. Other examples of device context can include, but are not limited to, the computing device 202 playing music, and the computing device 202 placing/making a phone call.

The device context module 218 can determine that a user is interacting with the computing device 202 while the computing device 202 is in a particular state (e.g., playing/streaming a video). This context can be considered a "human" context because the context is based on interactions of a user with the computing device 202. For example, a user may squeeze, rotate, shake, or otherwise maneuver the computing device 202 while the computing device 202 is in a particular state. One or more of the sensors 212 may detect these types of interactions. In addition, or in the alternative, a user may provide input to the computing device 202 using one or more of the input device(s) 204. For example, a user may contact or hover over a touchpad/trackpad included in the computing device 202. In addition, or in the alternative, a user may provide input to the computing device using a touchscreen (e.g., the display device 206 can include a touch-sensitive surface).

In some implementations, the device context module 218 may access a calendar application included on the computing device 202. A user can consent to allow the access. For example, the device context module 218 can determine that a user is in a meeting based on a calendar entry. The device context module 218 can obtain date and time information/data from a real-time clock included in the computing device 202. The device context module 218 can access the calendar application and determine that the user is in a meeting based on a particular date and time entry (e.g., the current date and time).

The gesture detection module 216 can detect particular inputs provided by a user interacting with the computing device 202 as gestures. For example, the display device 206 can be a touchscreen. A user may contact the touch-sensitive surface of the display device 206 using a certain motion or gesture (e.g., drag a finger from the bottom to the top of the display device 206). The gesture detection module 216 can determine that the input motion is a particular gesture. In another example, a user may rotate, shake or perform other movements/motions while holding or otherwise contacting the computing device 202, such as putting the computing device 202 down on a table. The sensors 212 included on the computing device 202 can provide information and data about the movement of the computing device 202 and about user interactions (if any) with the computing device 202 while it is moving. For example, one or more accelerometers can measure a force of acceleration caused by movement of the computing device 202 or by gravity. A gyroscope can be used alone or together with the one or more accelerometers to aid in determining and improving motion-sensing accuracy. The computing device 202 can use the data and information provided by the accelerometer(s) and the gyroscope to determine the roll, pitch and yaw of the computing device 202, along with how much and how fast the computing device 202 is moving. In this case, the movement of the computing device 202 can be considered a gesture.

In addition, a user may be interacting with the input device(s) 204 while moving the computing device 202. In these cases, the determined movement of the computing device 202 along with the detected input from the input device(s) 204 can be considered a gesture. In some cases, a user may effectively hold the computing device 202 in a stationary position while providing input to the input device(s) 204. In some cases, the computing device 202 may be placed on a stationary surface while a user interacts with the input device(s) 204. In these cases, the interaction of the user with the input device(s) 204 can be considered a gesture.

The prediction module 224, included in the activity module 226, can use a particular gesture performed on the computing device 202 in combination with a context for the computing device 202, the determined location of the computing device 202, user data indicative of a demographic of a user of the computing device 202, and demographic data obtained from a server. For example, referring to FIG. 1, the computing device 202 can obtain demographic data included in the demographic data records 114 that the information server 106 can provide to the computing device 202 by accessing the demographic data database 112 to use in predicting an activity to perform on the computing device 202.

For example, an algorithm executed by the computing device 202 (e.g., the prediction module 224) can use machine learning to "learn" to associate with a user demographic certain typical patterns of movement of the computing device 202. The association can be to actions performed by the computing device 202 when the computing device 202 is within a certain context, at a particular location, and when the computing device 202 detects the movement pattern. In some cases, the learned behavior can be obtained from analyzing the state of a computing device leading up to the performing of particular actions. The learned behavior can be obtained from analyzing the state of a computing device when particular actions are performed. In some cases, the learned behavior can be obtained from analyzing state information and data associated with an aggregate group of computing devices. In these cases, the computing device 202 can determine what action(s) are performed (e.g., a video is casted) when a device is at a particular generic location (e.g., at home), in a particular context (e.g., playing a video), for a particular generic user demographic (e.g., a student) when a certain movement/gesture is detected (e.g., the device is rotated while input is received from a touchscreen on the device).

The state information can include a location, a context, and movements/gestures associated with the computing device. The state information can be associated with a demographic for a user of the computing device at the time the action is performed. In some cases, in addition, the computing device can use feedback or confirmation provided by a user when the action is performed. In cases where the user confirms the action, the information can be provided to the information server 106 for inclusion in the demographic data database 112. The confirmation of the action can increase the probability associated with the action for the particular demographic. In subsequent determinations, the increased probability can lead to a system (e.g., the system 100 in FIG. 1) that can better predict actions to perform on a computing device (e.g., the computing device 102*a*) based on a context for the computing device, the determined location of the computing device, user data indicative of a demographic of a user of the computing device, and demographic data obtained from a server.

The computing device 202 can store learned and trained information for the user and for detected user interactions with the computing device 202 in memory 222. When predicting an action, the prediction module 224 can additionally use information and data stored in the memory 222 to customize the user's experience with the computing device 202 by further "fine-tuning" the prediction of the action based on specific user preferences. For example, the prediction module 224 can employ a hierarchical decision tree when using the demographic data obtained from a server along with the stored user preferences on the computing device 202 to determine a narrowing of the specialization of usage for the computing device 202. In some implementations, the user preferences can be included in and/or associated with an account for a user. In some cases, the user preferences can be stored locally on the computing device. In some cases, the user preferences can be stored remotely on a server accessible by the computing device.

Since each user of a computing device can use different gestures to signify the desire for the computing device to perform the same action, putting each user's identified gestures within a context of a computing device can associate the identified gesture with the desired action. The use of machine learning can result in a more efficient guess or association of the gesture with the desired action. The machine learning can monitor a user's gestures along with the context of the device and gather this data to provide more accurate decisions and/or predictions. The machine learning can identify cancellations (undos) of an action and/or the lack of cancellations (undos) of an action to determine a success/failure ratio for the associated action with the identified gesture. In some implementations, the learned behavior can be overridden by the user.

Machine learning can be used to "learn" one or more orientations of a computing device. For example, machine learning can "learn" what is "flat on a horizontal surface" (the computing device is placed in a horizontal position, flat, in contact with a flat horizontal surface, and is stationary). For example, machine learning can "learn" what is "located in a pocket" (the computing device is orientated in substantially a non-horizontal direction (can be orientated in a vertical or near vertical direction with respect to the ground), and may be moving.

In some implementations, the application processor 210 and/or the controller 214 can execute one or more algorithms that process the received gestures. For example, one or more smoothing or noise-cancelling algorithms can reduce and/or eliminate any inadvertent noise received on the signals associated with the input gestures (e.g., on the signals received from the sensors 212, the input device(s) 204 and/or the display device 206 (for example, when the display device 206 is a touchscreen)). In another example, the application processor 210 and/or the controller 214 can perform algorithmic smoothing of the received input signal data for the user gestures reducing/eliminating any input errors that may be associated with a user's shaky hands.

In some implementations, the prediction module 224 can base learned behavior on gestures received by and the actions performed by the computing device 202. In some implementations, referring to FIG. 1, the data gathering application 132 included on the information server 106 can use information obtained from the demographic data records 114 (historical data) to determine (predict) actions to associate with particular gestures detected on the computing device 202. In these cases, the use of a larger database (data source) of information can result in faster and more accurate predictions of actions to associate with particular gestures. Also, in these implementations, a user of the computing device 202 can override the association of the action with the gesture if the action is not the desired action by the user. The overriding and/or acceptance of the action by the user contributes to the customized machine learning for the user of the computing device 202.

In some implementations, the computing device 202 (the prediction module 224) can combine the information and data provided by the information server 106 (the data gathering application 132) with the information and data for the user included in the memory 222 to determine (predict) actions to associate with particular gestures detected on the computing device 202. This essentially "fine-tunes" or customizes the prediction based further on specific user preferences. In some cases, for example, the decision (prediction) determined by the prediction module 224 may override the decision (prediction) determined by the data gathering application 132.

FIGS. 3A-F are diagrams that show illustrations of user interactions with a computing device 302 that result in particular detected movements and/or gestures. In some implementations, the computing device 302 can be part of or included in the computing device 102a, the computing device 102b, or the computing device 102c as shown in FIG. 1. In some implementations, the computing device 302 can be the computing device 202 as shown in FIG. 2.

Figure 3F:
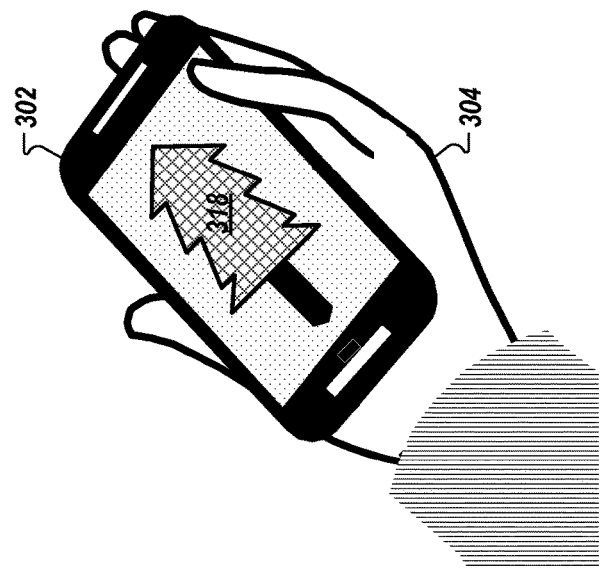

FIGS. 3A-F show a user 304 (and specifically a hand of a user) holding the computing device 302. The user can interact with the computing device 302 moving the computing device vertically along a y-axis (up and down (direction 31)) as shown in FIG. 3A. The user can interact with the computing device 302 moving the computing device horizontally along an x-axis (side to side (direction 33)) as shown in FIG. 3B. The user can interact with the computing device 302 moving the computing device horizontally along a z-axis (back and forth, towards and away from them (direction 35)) as shown in FIG. 3C. The user can interact with the computing device 302 rotating/moving/shaking the computing device (direction 37) as shown in FIG. 3D.

Figure 3E:
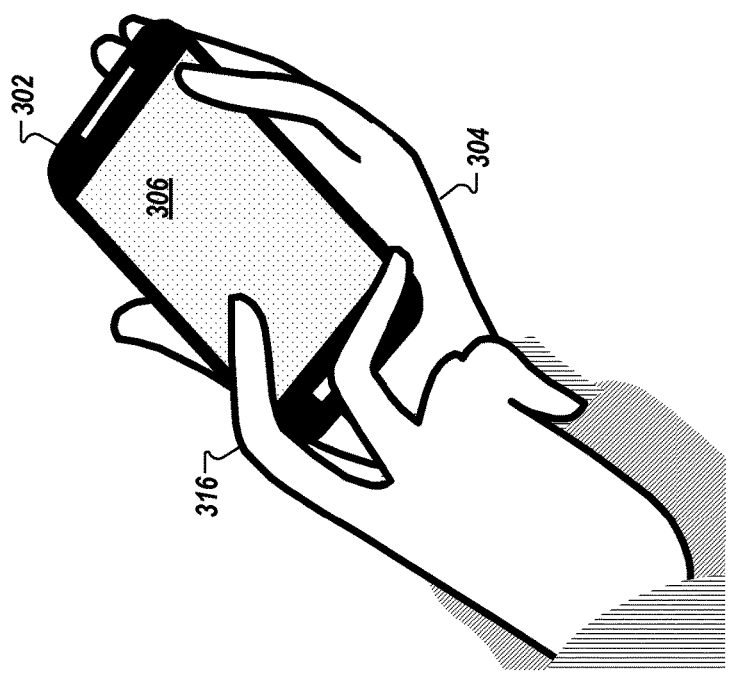

FIG. 3E shows the user 304 of the computing device 302 making contact with, for example, a touchscreen 306 included in the computing device 302. Though FIG. 3E shows the user 304 contacting the touchscreen 306 using a finger 316, the user 304 may contact the touchscreen 306 using other fingers or using a stylist or other conductive device.

FIG. 3F shows an image 318 displayed on the touchscreen 306 of the computing device 302. The display of the image 318 can occur based on the detected touchscreen contact and/or based on a particular movement (or a combination of movements) of the computing device 302 as shown in FIGS. 3A-D.

As described above, each movement/movement pattern of the computing device 302 (e.g., as shown in FIGS. 3A-D) can be used along with other criteria to determine an action to perform on the computing device 302. In some cases, the computing device 302 can detect the contact with the touchscreen 306 along with movement of the computing device 302 (as shown in one of FIGS. 3A-D) and in response display the image 318. As described above, other criteria can be identified along with the detected movement/movement pattern of the computing device 302 when determining to display the image 318.

Figure 3G:
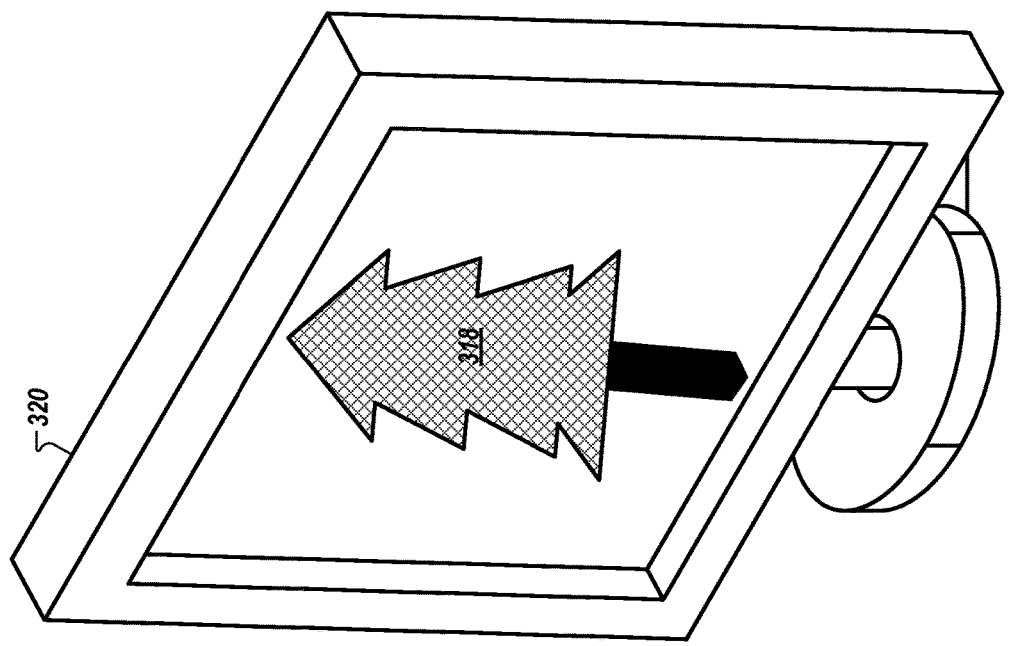
FIG. 3G shows the user holding the computing device while moving the computing device or using a particular motion or gesture to further provide the image displayed on the touchscreen to an auxiliary device.
Figure 3G:
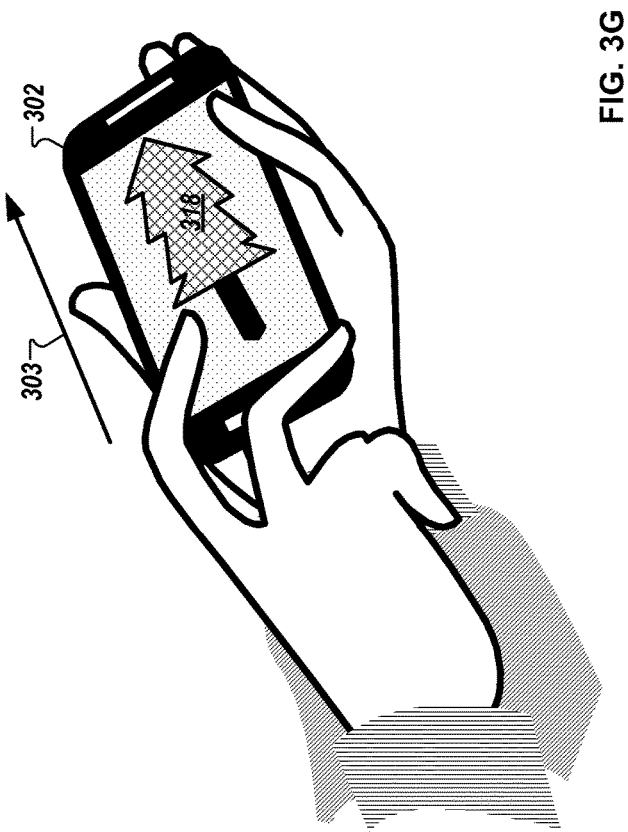

FIG. 3G shows the user 304 holding the computing device 302 while moving the computing device 302 or using a particular motion or gesture to further provide the image 318 displayed on the touchscreen 306 to an auxiliary device 320.

For example, referring to FIGS. 1, 2, 3D, 3F, and 3G, the user 304 can move/rotate/shake the computing device 302 (FIG. 3D) activating a video sharing application that plays a favorite channel/video on the touchscreen 306. In some cases, the favorite channel/video on the touchscreen 306 can also be dynamically casted to the auxiliary device 320 when the computing device 302 is in proximity to (within the range of) the auxiliary device 320. The prediction module 224 can use additional criteria to determine the activation of the specific video sharing application and the favorite channel/video to play. The prediction module 224 can obtain device context data from the device context module 218, location data from the location detection module 220, and user data (user demographic data) from the memory 222. For example, the device context data can be indicative of the computing device 302 being idle and the time of day being later than 6:00 pm, the location data can indicate that the computing device 302 is located at the home of the user, and the user data can indicate that the user is a 20 year old college student who is majoring in politics and who loves dogs. Based on this information and past behaviors and interactions of the user with the computing device 302 (historical data), the computing device 302 can activate the video sharing application, play a dog video, and based on the detected movement/gestures, the video can be dynamically provided/sent to the auxiliary device 320 that is in proximity to the auxiliary device 320. In another example, if the device context data indicates that the time of day is before 6:00 pm, and the location data indicates that the computing device 302 is not located at the home of the user, the computing device 302 can activate the video sharing application, and play a news video. Because the auxiliary device 320 is not in proximity to the computing device 302, the video is not provided/sent to the auxiliary device 320.

For example, the user 304 can move the computing device 302 towards/in the direction of the auxiliary device 320 (as shown by arrow 303) in order to cast the content on the computing device to the auxiliary device 320 when the computing device 302 is in proximity to (within the range of) the auxiliary device 320.

Figure 4:
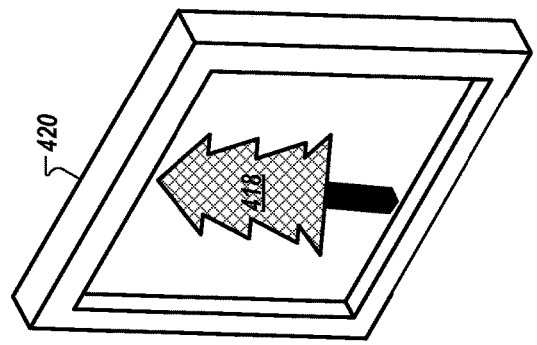
FIG. 4 is a diagram that shows an illustration of a user interaction with a computing device that results in providing an image displayed on a display device included in the computing device to an auxiliary device.
Figure 4:
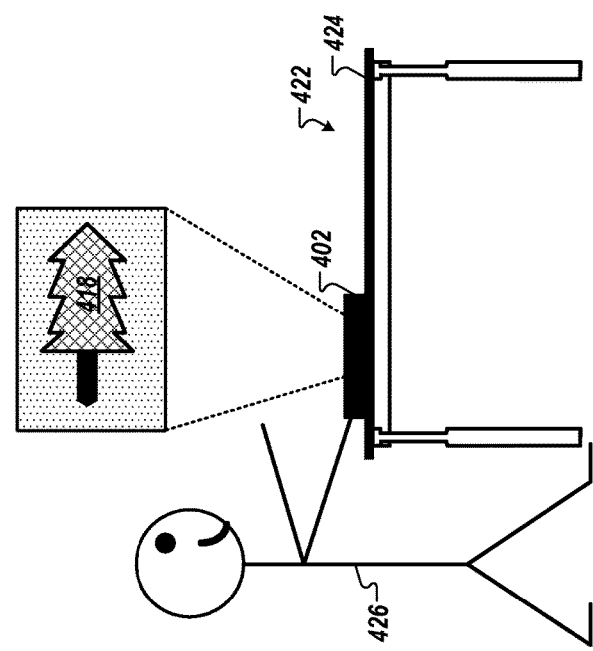

FIG. 4 is a diagram that shows an illustration of a user interaction with a computing device 402 that results in providing an image 418 displayed on a display device included in the computing device 402 to an auxiliary device 420. In some implementations, the computing device 402 can be part of or included in the computing device 102a, the computing device 102b, or the computing device 102c as shown in FIG. 1. In some implementations, the computing device 402 can be the computing device 202 as shown in FIG. 2 or the computing device 302 as shown in FIGS. 3A-G.

In some implementations, learned behavior can be associated with different actions based on other contextual information. For example, as shown in FIG. 4, when a user 426 is at home (e.g., referring to FIG. 2, the location detection module 220 determines that the location of the computing device 202 is at the home of the user), the learned behavior of the user 426 placing the computing device 402 down in a flat position on a horizontal surface (e.g., a horizontal flat surface 424 of a table 422) while a video is being displayed on the computing device 402 results in providing/sending the content being displayed on the display device (the image 418) to the auxiliary device 420. In another example, when the user is at work (e.g., referring to FIG. 2, the location detection module 220 determines that the location of the computing device 202 is at the work location of the user), the learned behavior of the user placing the computing device 402 down in a flat position on a horizontal surface while a video is being displayed on the computing device 402 can result in stopping the display of the video on the computing device 402.

Figure 5:
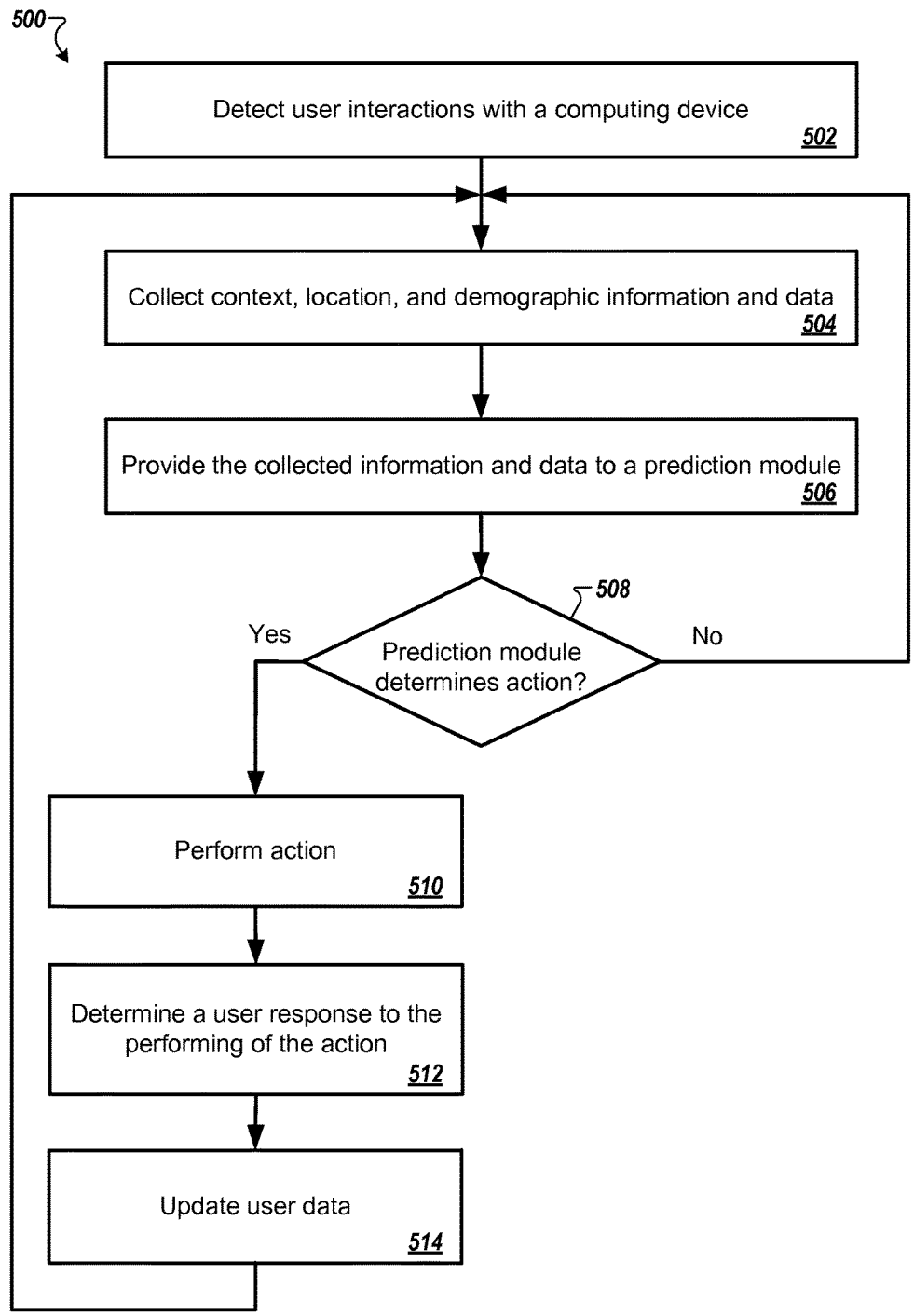
FIG. 5 is a flowchart that illustrates a method of determining an action for performing on a computing device.

FIG. 5 is a flowchart that illustrates a method 500 of determining an action for performing on a computing device. In some implementations, the systems and computing devices described herein can implement the method 500. For example, the method 500 can be described referring to FIGS. 1, 2, and 3A-G.

User interactions with a computing device are detected (block 502). As described above, a user can interact with a computing device (e.g., the computing device 102a) by moving/rotating/shaking the device and/or providing input to the device using input device(s) and/or a touch-sensitive display device (e.g., a touchscreen). Sensors (e.g., sensors 212) included on the computing device (e.g., the computing device 102a) can sense/detect user interactions with the computing device.

Context, location, and demographic information and data is collected (block 504). As described above, data indicative of a context of the computing device (e.g., the computing device 102a) can be determined. Demographic data can be collected from either or both of memory (e.g., the memory 222) on the computing device (e.g., the computing device 102a) and aggregated data included in a database (e.g., demographic data database 112) remote from the computing device. For example, user demographic data that can include user preferences can be obtained from memory (e.g., memory 222) included on the computing device (e.g., the computing device 102a). Aggregated demographic data that can include a probability of a particular action associated with the demographic data can be obtained from a database (e.g., demographic data database 112) remote from the computing device. For example, the computing device (e.g., the computing device 102a) can access a remote server (e.g., the information server 106) in order to obtain the aggregate demographic data. In another example, the aggregate demographic data may be stored in a database located in the cloud.

The information and data is provided to a prediction module (block 506). For example, the prediction module 224 can receive data/information from the gesture detection module 216, the device context module 218, and the location detection module 220. The prediction module 224 can also access user demographic data in the memory 222 and can receive aggregate user demographic data from a remote server by way of the communications module 230.

The prediction module determines whether or not the data predicts an action for performing on the computing device (block 508). If the data does not predict an action for performing on the computing device, the method 500 proceeds to detect another user interaction with the computing device (block 502). For example, in determining that the data does not predict an action for performing on the computing device, the prediction module 224 can determine that based on any one of, a combination of, or all of the data that the detected interactions with the computing device, the state of the computing device (e.g., context and location), user demographic data, and, in some cases, aggregate user demographic data do not predict an action for performing on the computing device. In some cases, a probability associated with a predicted action may not be large enough for the prediction module 224 to have the activity module 226 perform the predicted action on the computing device 202.

The prediction module determines that the data predicts an action for performing on the computing device (block 508). For example, the prediction module 224 determines the action with the highest associated probability for performing on the computing device 202 in cases where there are more than one action associated with a set of criteria for the computing device 202.

The action is performed on the computing device (block 510). A user response to the performing of the action is determined (block 512). In some implementations, a user may provide confirmation that the action performed was a preferred action. In some implementations, a user may be provided with a user interface (UI) on the display device 206 of the computing device 202 that requests confirmation that the action be performed on the computing device before the action is performed. The activity module 226 can receive user confirmation that the predicted action was the action desired by the user for performing on the computing device 202.

User data is updated (block 514). For example, the user data included in the memory 222 can be updated to indicate a preference for the user. For example, if the user provided confirmation that the action was the preferred action the user wanted performed on the computing device, this information can be stored with/associated with the information and data used to predict the action. For example, user demographic data included in the memory can be updated, associating the action with the data or increasing the probability of the action associated with the data. In addition, or in the alternative, aggregated user demographic data (e.g., the data stored in the demographic data database 112) can be updated accordingly. The method 500 continues to detect user interactions with the computing device (block 502).

Though shown as separate modules in FIG. 2, in some implementations, the prediction module 224, the activity module 226, the gesture detection module 216, the device context module 218, and the location detection module 220 can be included as part of the O/S 228. In these implementations, content provided to and displayed on the display device 206 included in the computing device 202 could be dynamically redirected to an auxiliary device by the operations of the operating system.

In some implementations, the prediction module 224, the activity module 226, the gesture detection module 216, the device context module 218, and the location detection module 220 can be included as part of an application running on the computing device 202 (e.g., a web browser application). The prediction module 224, the activity module 226, the gesture detection module 216, the device context module 218, and the location detection module 220 could be included in a software development kit for integration into applications for various hardware and system platforms.

In some implementations, detected particular user interactions with a computing device can provide a type of security based interaction with the computing device and casting sessions initiated by the computing device. For example, when the computing device casts content on the computing device to a cast-enabled device a casting session is created. The casting session can be open to any computing device that can connect to/interface with the cast-enabled device. As such, a second computing device can control a casting session started by a first computing device. The particular user interaction with the first computing device that started/initiated the casting session can be used as a type of "lock" on the session. In order for the second computing device to connect to/interface with the session on the cast-enabled device created by the first computing device, a user of the second computing device would need to interact with the second computing device using the same particular user interactions that started/initiated the session.

Figure 6:
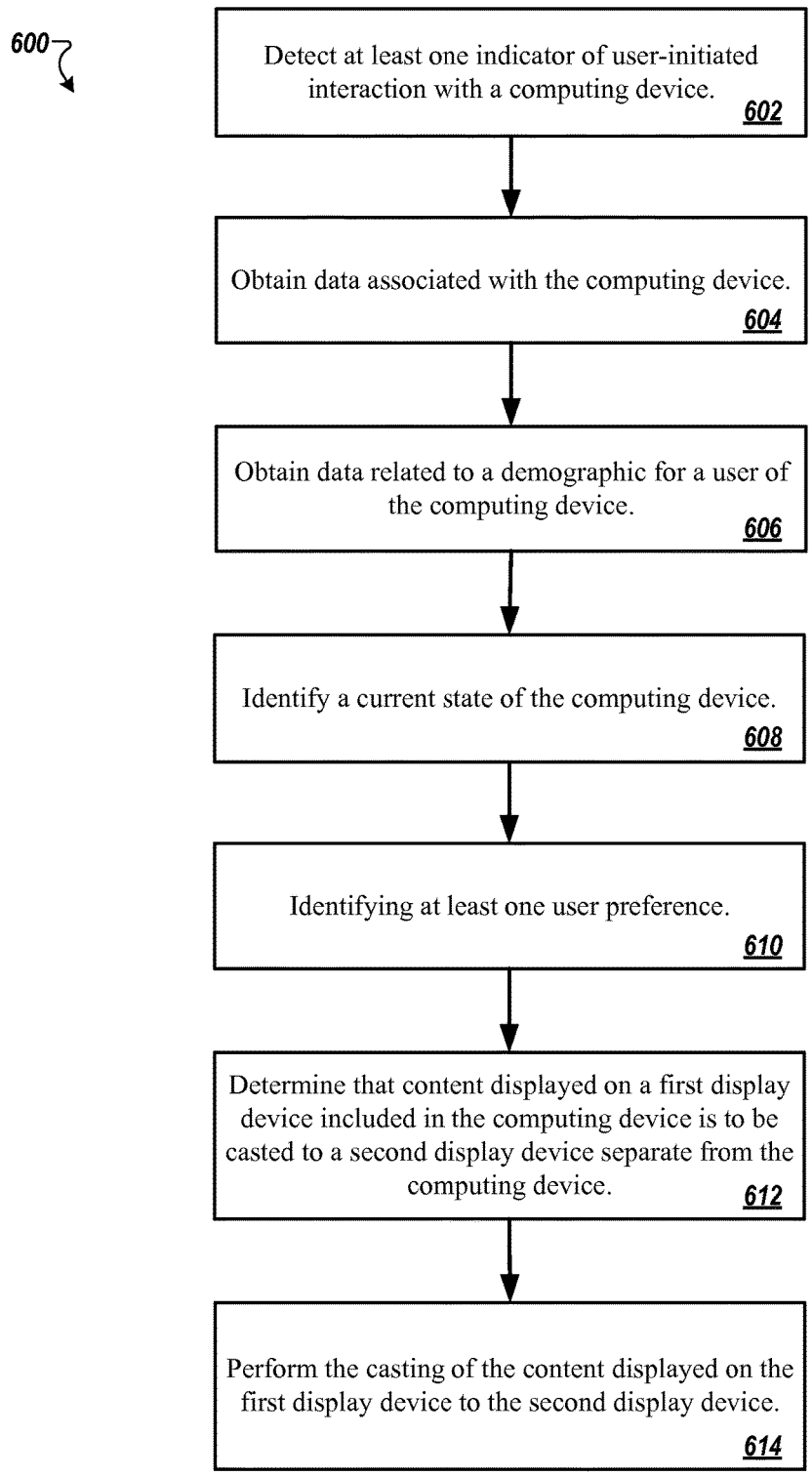
FIG. 6 is a flowchart that illustrates a method for providing content from a first display device included in a computing device to an auxiliary second device.

FIG. 6 is a flowchart that illustrates a method 600 for providing content from a first display device included in a computing device to an auxiliary second device (e.g., casting content from a first display device included in a computing device to a cast-enabled second device). In some implementations, the systems described herein can implement the method 600. For example, the method 600 can be described referring to FIGS. 1, 2, 3A-G, and 4.

At least one indicator of user-initiated interaction with a computing device is detected (block 602). For example, the computing device 102a can detect user-interaction with the computing device 102 as described herein and as shown, for example, in FIGS. 3A-G, and FIG. 4. Data associated with the computing device is obtained (block 604). For example, the prediction module 224 included in the computing device 202 can access memory 222 to obtain demographic data associated with a user of the computing device 202. The prediction module 224 can obtain location data and information associated with the computing device 202 from the location detection module 220. The prediction module 224 can obtain context data and information for the computing device 202 from the device context module 218. The prediction module 224 can obtain data and information based on detected movement of and/or user-interactions with the computing device 202 from the gesture detection module 216.

Data related to a demographic for a user of the computing device is obtained (block 606). For example, the computing device 102a can access an information server 106 to obtain aggregate demographic data from the demographic data database 112. The aggregate demographic data can be related to one or more characteristics associated with a user of the computing device 102a.

A current state of the computing device is identified (block 608). For example, the computing device 102a may be playing streaming video content, displaying the video content on the display device 206 along with providing audio content on one or more speakers included in the output devices 206.

At least one user preference is identified (block 610). For example, the prediction module 224 included in the computing device 202 can access memory 222 to obtain at least one user preference for a user of the computing device 202.

It is determined that content displayed on a first display device included in the computing device is to be casted to a second display device separate from the computing device (block 612). The prediction module 224 can analyze/evaluate the at least one indicator of user-initiated interaction with the computing device, the data associated with the computing device, the data related to a demographic for a user of the computing device, the current state of the first computing device, and the at least one user preference in order to determine that the content is to be casted.

The content displayed on the first display device to the second display device is casted (block 614). The activity module 224 can initiate and perform the casting of the content. The casting of the content can result in displaying the content on the second display device.

Figure 7:
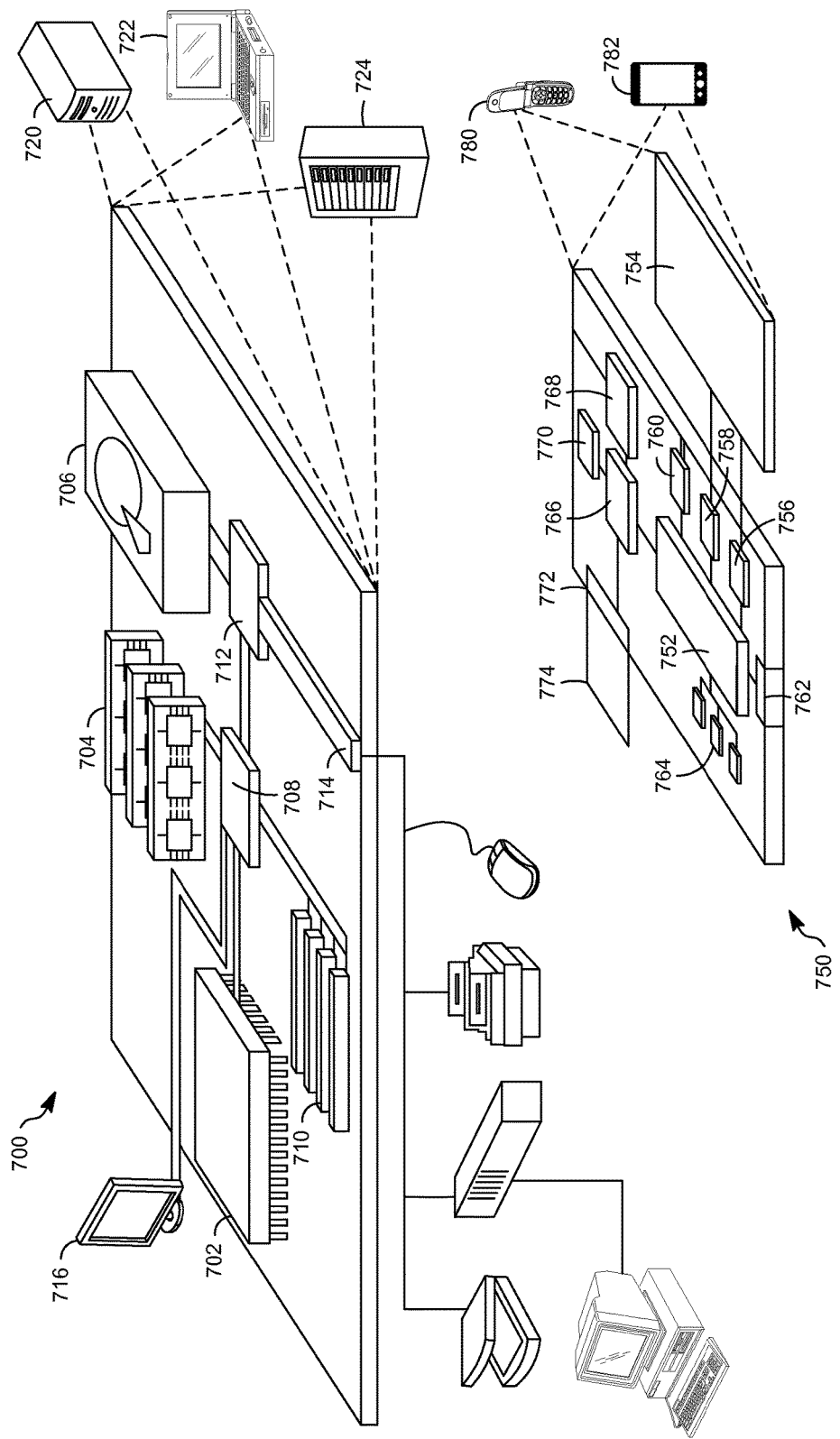
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The computing system can include clients and servers. A client and server are generally remote from each other and typically interact through a communication network. The relationship of client and server arises by virtue of computer programs running on the respective computers and having a client-server relationship to each other.

In situations in which the systems and methods discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
    obtaining, by a first device, data representing a demographic characteristic of a user of the first computing device;
    receiving, by the first device and from a database remote from the first device, untethered aggregated demographic data for a group of individuals; and
    casting content playing on the first device to a second device separate from the first device,
    the casting being triggered by:
        detecting at least one indicator of user-initiated interaction with the first device;
        identifying, by the first device, that the first device is currently playing the content; and
        determining that the data representing the demographic characteristic of the user of the first device is included in the untethered aggregated demographic data.

2. The method of claim 1, wherein the casting is further triggered by determining that a probability associated with the casting exceeds a threshold value.

3. The method of claim 1, further comprising receiving confirmation that the first device is to perform the casting before the first device casts the content.

4. The method of claim 1, further comprising receiving, after the casting, an indication of a response of the user to the casting.

5. The method of claim 4, further comprising storing the indication of the response in association with the casting.

6. The method of claim 1, further comprising:
    identifying at least one user preference associated with the first device and included in an account accessible by the user of the first device; and
    wherein the casting is further based on the at least one user preference.

7. The method of claim 6, further comprising:
    receiving, after the casting, an indication of a response of the user to the casting; and
    updating the at least one user preference based on the received indication of the response of the user.

8. The method of claim 1, wherein the untethered aggregated demographic data for the group of individuals is obtained from one or more demographic data records for a common subset of demographics for the group of individuals.

9. The method of claim 1, wherein the untethered aggregated demographic data for the group of individuals is used to predict an action to be performed on the first device.

10. The method of claim 1, wherein the user-initiated interaction with the first device is a physical interaction of the user with the first device.

11. The method of claim 1, wherein the user-initiated interaction is a movement of the first device by the user of the first device.

12. The method of claim 1, wherein identifying a current state of the first device is based on receiving data indicative of at least one identified condition associated with the first device.

13. The method of claim 12, wherein a current state of the computing device is identified as at least one of playing music, playing video content, or displaying an image on the first display device.

14. The method of claim 12, wherein the data indicative of at least one identified condition associated with the first device is received from one or more sensors included in the first device.

15. The method of claim 1, wherein the casting further includes:
displaying the content on the second device without displaying the content on the first device; and
allowing the first device to control the displaying of the content on the second device.

16. The method of claim 1, wherein the casting is further triggered by a proximity of the first device with the second device.

17. An apparatus, comprising:
a plurality of sensors configured to provide data indicative of at least one identified condition associated with a first device;
a location detection module configured to identify a proximity of the first device with respect to a second device;
a device context module configured to identify a context of the first device;
a gesture detection module configured to identify at least one gesture associated with the first device;
a memory configured to store at least one characteristic associated with a user of the first device; and
an activity module configured to cast content from the first device to the second device, the casting being triggered by a combination of:
the identified proximity,
the identified context,
the identified at least one gesture,
the data indicative of movement of the first device, and
determining that data representing a demographic characteristic of a user of the first device is included in untethered aggregated demographic data.

18. The apparatus of claim 17, wherein the plurality of sensors includes at least one of a temperature sensor, an ambient light sensor, a magnetic field sensor, a gyroscope, a heart rate sensor, a relative humidity sensor, an accelerometer, a pressure point sensor, an altimeter, a barometer, an infrared (IR) sensor, or a step detector.

19. The apparatus of claim 17, wherein the at least one gesture associated with the first device includes at least one of a rotation of the first device, a shaking of the first device, a squeezing of the first device, an up-and-down movement of the first device, a side-to-side movement of the first device, a back-and-forth-movement of the first device, or a contact of a surface of the first device.

20. A non-transitory, machine-readable medium having instructions stored thereon, the instructions, when executed by a processor, cause a first device to:
obtain data representing a demographic characteristic of a user of the first device;
identify at least one preference of the user of the first device;
receive, from a database remote from the first device, untethered aggregated demographic data for a group of individuals;
cast content playing on the first device to a second device separate from the first device, the casting being triggered by:
detecting at least one indicator of user-initiated interaction with the first device;
identifying, by the first device, that the first device is currently playing the content;
the identified at least one user preference, and
determining that the data representing the demographic characteristic of the user of the first device is included in the untethered aggregated demographic data.

21. The non-transitory, machine-readable medium of claim 20, wherein the casting is further based on determining that a probability associated with the providing of the content exceeds a threshold value.

22. The non-transitory, machine-readable medium of claim 20, the instructions further causing the first device to receive confirmation that the first device is to provide the content before the first device provides the content.

23. The non-transitory, machine-readable medium of claim 20, the instructions further causing the first device to receive, after providing the content, an indication of a response of the user to the providing of the content.

24. The non-transitory, machine-readable medium of claim 20, wherein identifying a current state of the first device is based on receiving data indicative of at least one identified condition associated with the first device.

25. The non-transitory, machine-readable medium of claim 20, wherein the casting is further triggered by a proximity of the first device with the second device.

* * * * *